United States Patent [19]
Wong et al.

[11] Patent Number: 5,860,928
[45] Date of Patent: Jan. 19, 1999

[54] METHOD AND SYSTEM FOR SELECTIVELY SMOOTHING COLOR FLOW IMAGES IN AN ULTRASOUND SYSTEM

[75] Inventors: King-Yuen Wong, Issaquah; Zoran Banjanin, Newcastle; Dong-Chyuan Liu, Mercer Island, all of Wash.

[73] Assignee: Siemens Medical Systems, Inc., Iselin, N.J.

[21] Appl. No.: 908,647

[22] Filed: Aug. 7, 1997

[51] Int. Cl.[6] .................................................... A61B 8/06
[52] U.S. Cl. .......................................... 600/453; 600/455
[58] Field of Search ........................... 600/437, 440–441, 600/453–456; 382/260–262, 270, 272–274

[56] References Cited

U.S. PATENT DOCUMENTS

| | | | |
|---|---|---|---|
| 5,163,434 | 11/1992 | Kumazawa | 600/455 |
| 5,190,044 | 3/1993 | Kawasaki et al. | 600/455 |
| 5,357,580 | 10/1994 | Forestieri et al. | 382/6 |
| 5,479,926 | 1/1996 | Ustoner et al. | 600/455 |
| 5,487,389 | 1/1996 | Banjanin et al. | 600/455 |
| 5,494,037 | 2/1996 | Banjanin et al. | 600/455 |
| 5,515,852 | 5/1996 | Karp et al. | 600/455 |
| 5,544,659 | 8/1996 | Banjanin | 600/455 |
| 5,594,807 | 1/1997 | Liu | 382/128 |
| 5,609,155 | 3/1997 | Guracar | 600/453 |
| 5,653,234 | 8/1997 | Kim et al. | 600/437 |
| 5,664,575 | 9/1997 | Banjanin et al. | 600/455 |
| 5,669,385 | 9/1997 | Pesque et al. | 600/453 |

Primary Examiner—Francis J. Jaworski

[57] ABSTRACT

A method (280) and system (128) for selectively smoothing color flow images in a Doppler ultrasound system (100). A set of original digitized ultrasound signals is received for points (m, m−1, m−2) on a beamline (1–1), each point having associated with it a velocity signal ($\phi_j$), a magnitude of autocorrelation signal ($R_i$), and a power signal ($P_i$). A point (X(1,1)) along a beamline is selected for processing. The set of digitized ultrasound signals is applied to a digital filter (152), and the digital filter computes a set of smoothed digitized ultrasound signals by computing an average velocity signal ($\phi_{av}$), an average magnitude of autocorrelation signal ($R_{av}$), and an average power signal ($P_{av}$) of each point in the selected beamline and points in adjacent beamlines. For the selected point along the selected beamline, a selected velocity signal ($\phi(1,1)$) is compared to a velocity threshold ($V_{th}$), a selected magnitude of autocorrelation signal (R(1, 1)) is compared to a magnitude of autocorrelation threshold ($R_{th}$), and a selected power signal (P(1,1)) is compared to a power threshold ($P_{th}$). Color flow information is computed from the smoothed digitized ultrasound signals when each of the selected velocity signal, the selected magnitude of autocorrelation signal, and the selected power signal is less than the velocity threshold, the magnitude of autocorrelation threshold, and the power threshold, respectively. The color flow information is computed from the set of original digitized ultrasound signals when any one of the selected velocity signal, the selected magnitude of autocorrelation signal, or the selected power signal is greater than or equal to the velocity threshold, the magnitude of autocorrelation threshold, or the power threshold, respectively. The color flow information is overlaid onto an ultrasound image.

16 Claims, 12 Drawing Sheets

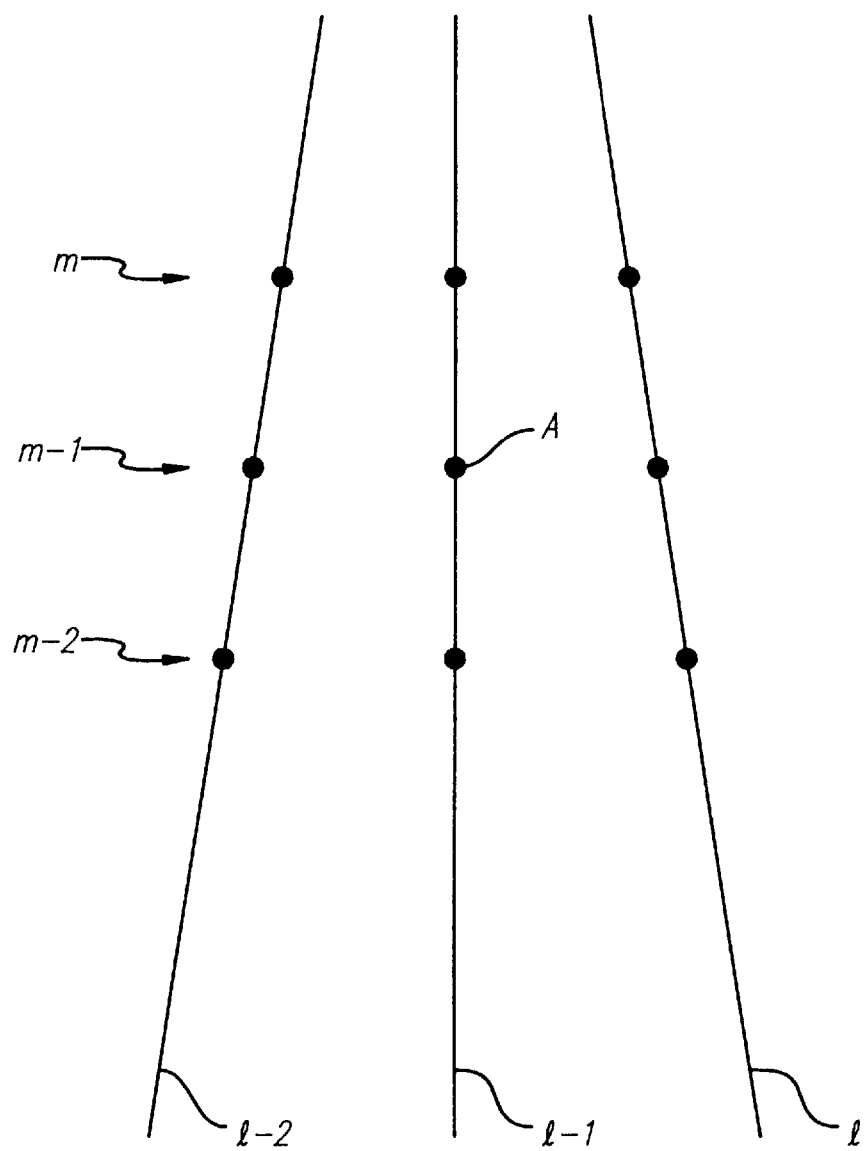

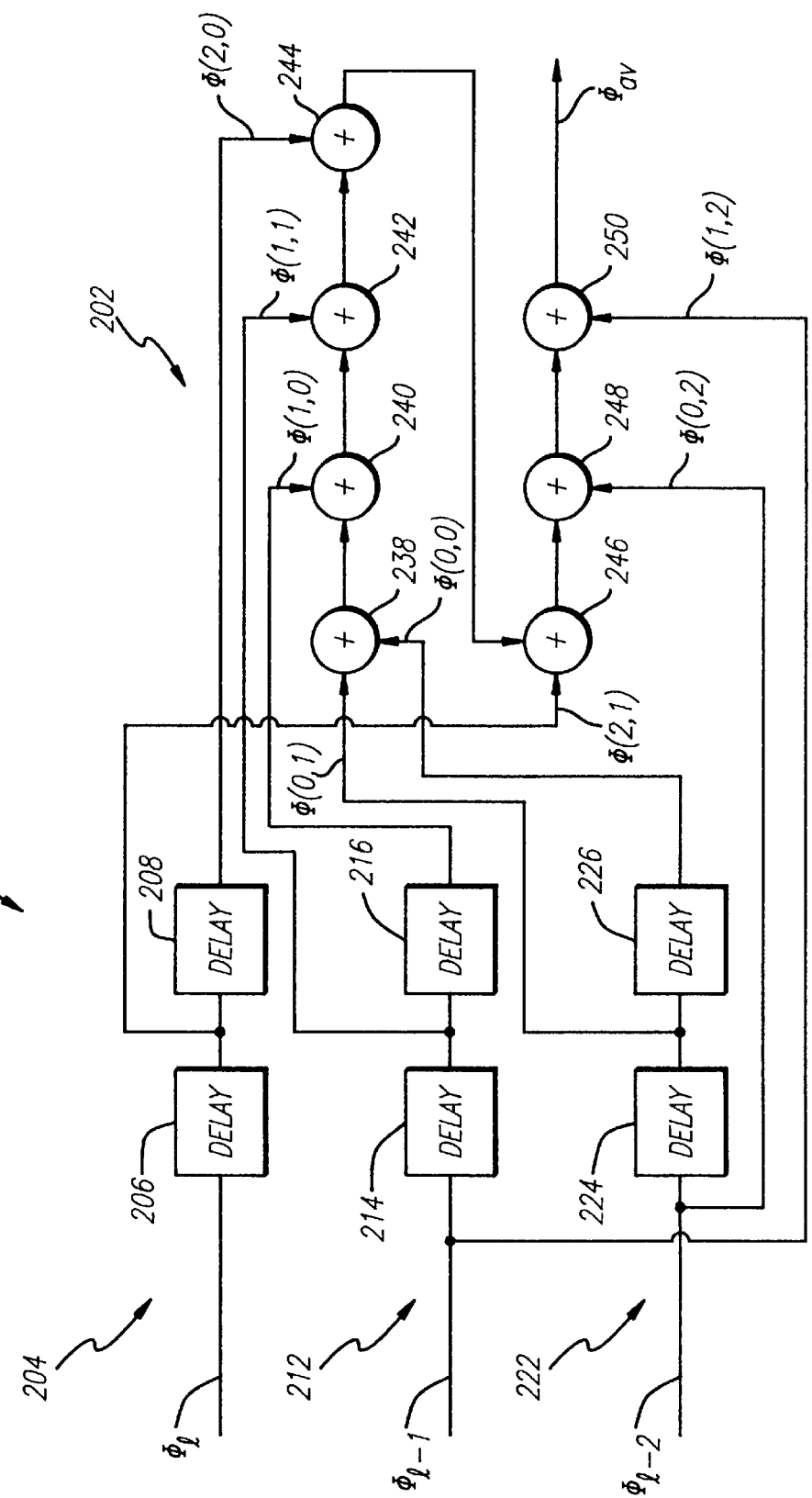

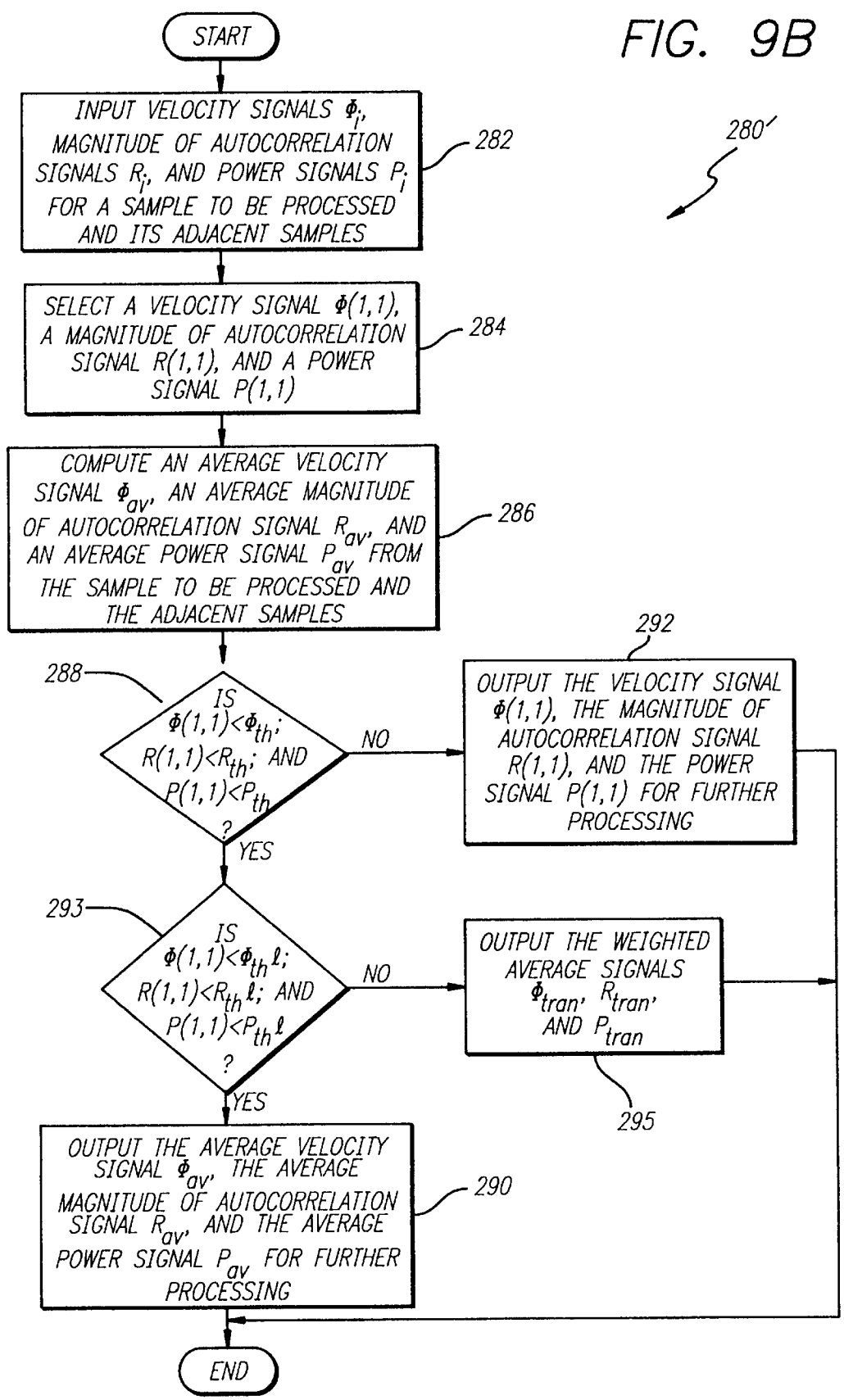

METHOD AND SYSTEM FOR SELECTIVELY SMOOTHING COLOR FLOW IMAGES IN AN ULTRASOUND SYSTEM

FIELD OF THE INVENTION

The present invention relates to image processing methods used in ultrasound medical systems and, more particularly, to a method for selectively smoothing color flow images in an ultrasound system.

BACKGROUND OF THE INVENTION

Ultrasound medical diagnostic systems generate images of anatomical structures within a patient's body by scanning a target area with ultrasound signals. Typically, ultrasound signals on the order of 2 MHz to 10 MHz are transmitted into a patient via a transducer probe. The transmitted ultrasound energy is in part absorbed, dispersed, refracted, and reflected by the patient's body. Reflected ultrasound energy is received at the transducer probe where it is converted into electronic echo signals. The echo signals undergo beam forming to correlate the ultrasound signals. Subsequently, the beam-formed signals, also referred to as beamlines or vectors, are processed to analyze echo, Doppler, and flow information and to obtain an image of the patient's targeted anatomy, such as tissue or blood flow.

Most ultrasound systems operate in an imaging or B-mode that provides a physician or sonographer with an image of the tissue under examination, and a color Doppler mode. A B-mode image, for example, is a brightness image in which component pixels are brightened in proportion to a corresponding echo signal strength. The brightness image represents a cross-section of a patient target area through a transducer's scanning plane.

FIG. 1 shows a typical B-mode ultrasound image 10 that is created by an ultrasound system and displayed to a physician or sonographer. The image 10 includes a two-dimensional picture of internal body matter of a patient. In the example shown, the body matter includes an artery 12 having walls 13 and an amount of blood 14 flowing through it. However, the B-mode ultrasound image 10 does not show a representation of the flow of blood 14 through the artery 12. To create a color Doppler image, color flow information is overlaid onto the B-mode image 10. The color flow image is color or brightness coded so that higher flow velocities appear brighter in the image 16 than lower flow velocities.

Occasionally, a portion of a returned echo signal may be missing due to scattering or absorption from a scatterer that is in the path of the returned echo signal. This causes a "hole" that appears in the color flow image 10 as a dark portion 32. Because low flow velocities are also represented in the color flow image as dark areas, the hole 32 can impair the ability of the sonographer or physician to analyze the image, especially when the hole 32 appears in an area of the color flow image 16 representing a high flow velocity.

FIG. 2A shows a profile 16 of the blood 14 flowing through the artery 12. The flow of the blood 14 in the artery 12 has a profile such that the flow has a low value near the walls 13, increases as the distance from the walls 13 increases, and is at a maximum near the center of the artery 12.

Conventional ultrasound systems attempt to improve color flow sensitivity by performing smoothing. Conventional smoothing averages flow velocity information over a two-dimensional window, or kernel. However, conventional smoothing is performed regardless of flow characteristics. That is, conventional smoothing is either performed on all pixels of a color flow image, or smoothing is not performed at all. As a result, conventional smoothing can result in smearing of ultrasound color flow images. Thus, the sharp flow profile of FIG. 2A is flattened as shown in FIG. 2B as a profile 17, and the resultant color flow image is blurred. Further, conventional smoothing can result in distortion of flow haemodynamics, especially during systole or turbulent flow, and consequently can result in loss of diagnostic information.

The above-mentioned disadvantages of conventional smoothing result because conventional smoothing is performed regardless of flow characteristics. Therefore, there is an unmet need in the art for a method of smoothing an ultrasound color flow image without causing the distortions associated with conventional smoothing techniques.

SUMMARY OF THE INVENTION

The present invention is a method and system for selectively and variably smoothing color flow images in an ultrasound medical diagnostic imaging system. The present invention improves sensitivity and reduces noise by selectively applying an appropriate degree of smoothing based on flow characteristics. That is, the present invention smoothes color flow images only when smoothing is appropriate or desired.

According to the present invention, a set of digitized ultrasound signals is received. The set of digitized ultrasound signals includes a plurality of adjacent beamlines, and each beamline includes a plurality of samples. Each sample has components that include a velocity signal, a magnitude of autocorrelation signal, and a power signal. A sample along a beamline is selected for processing. The set of received digitized ultrasound signals is applied to a digital filter. The digital filter computes a set of smoothed digitized ultrasound signals by computing an average velocity signal, an average magnitude of autocorrelation signal, and an average power signal from samples in the selected beamline and samples in adjacent beamlines. For the selected sample along the selected beamline, a selected velocity signal is compared to a velocity threshold, a selected magnitude of autocorrelation signal is compared to a magnitude of autocorrelation threshold, and a selected power signal is compared to a power threshold. Color flow information is computed from the smoothed digitized ultrasound signals when each of the selected velocity signal, the selected magnitude of autocorrelation signal, and the selected power signal is less than the velocity threshold, the magnitude of autocorrelation threshold, and the power threshold, respectively. The color flow information is computed from the set of received digitized ultrasound signals when any one of the selected velocity signal, the selected magnitude of autocorrelation signal, or the selected power signal is greater than or equal to the velocity threshold, the magnitude of autocorrelation threshold, or the power threshold, respectively. The color flow information is overlaid onto an ultrasound image.

According to further aspects of the present invention, the velocity threshold, magnitude threshold, and power threshold are adjustable and the degree of smoothing is adjustable. Weighting coefficients implemented by the digital filter may be rectangular coefficients, Gaussian coefficients, or triangular coefficients as desired to adjust the degree of smoothing.

According to one advantage of the present invention, holes in the color flow image are filled. Another advantage of the present invention is that random noises are suppressed, resulting in improved color sensitivity. Finally, the smearing of flow boundaries and haemodynamic distortion is minmized.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 4A is a diagram of a number samples taken along adjacent beamlines;

FIG. 8A is a detailed block diagram of a portion of the block diagram of FIG. 7;

FIG. 9 is a flowchart of a method according to the present invention; and

DETAILED DESCRIPTION OF THE PREFERRED EMBODIMENT

Exemplary Host Platform

Figure 3:
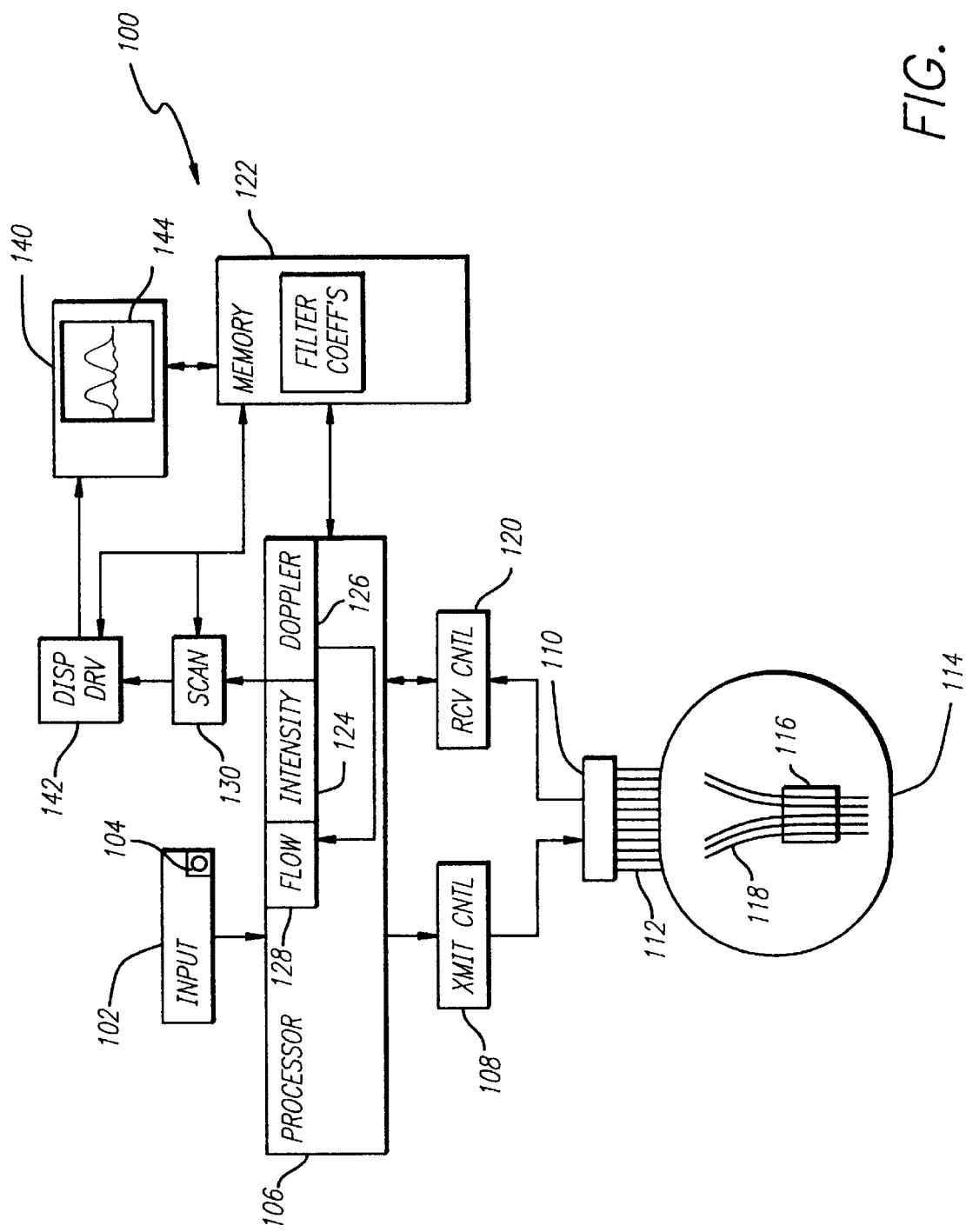
FIG. 3 is a block diagram of a Doppler ultrasound system in which the present invention is used.

FIG. 3 illustrates the main components of an ultrasonic imaging system 100 in which the present invention is used. The user enters various conventional scan parameters into an input unit 102 that typically includes devices 104 such as a keyboard, knobs, and buttons. The input unit 102 is connected to a processing system 106 that is typically an electrically connected and cooperating group of processors, such as microprocessors and digital signal processors. The processing system 106 may, however, be implemented as a single processor if it is powerful enough to perform the computational tasks described below.

The processing system 106 sets, adjusts, and monitors the operating parameters of a conventional transmission control circuit 108. This control circuit 108 generates and applies electrical control and driving signals to an ultrasonic probe 110, which includes an array of piezoelectric elements 112. As is well known in the art, the piezoelectric elements 112 generate ultrasonic waves when electrical signals of a proper frequency are applied to them.

By placing the probe 110 against the body 114 of the patient, ultrasonic waves enter an interrogation region 116 of the patient's body 114. By varying the phasing, amplitude and timing of the driving signals in a conventional manner, the ultrasonic waves are focused to form a scan beam that includes a series of scan lines 118 that typically fan out from the probe.

In most common applications of ultrasonic scanning, the interrogation region 116 is scanned as a pattern of two-dimensional (2-D) planes in order to generate 2-D information, such as a spatial map of the intensity of echo signals returned from the interrogation region 116, or a 2-D map of the velocity of the tissue moving within the interrogation region 116. Other techniques using both one- and two-dimensional ultrasound arrays are known that allow scan beams to lie in different planes, and thus generate 3-D representations of the scanned region and sense flow within three independent velocity components. The manner in which ultrasonic scanning signals are controlled, generated, and applied to the patients body 114 are well known in the art and therefore need not be described in further detail.

Ultrasonic echoes from the sound waves transmitted into the body 114 return to the array of piezoelectric elements 112 in the probe 110. The piezoelectric elements 112 in the array convert the small mechanical vibrations caused by the echoes into corresponding radio frequency (RF) electrical signals. Amplification and other conventional signal conditioning are then applied to the returned signals by a reception controller 120. This processing includes such signal conditioning as time-gating, gain compensation, and diffraction compensation in order to identify the echo signals that correspond to each scan plane of the interrogation region 116. The type of conventional signal processing needed will, in general, depend upon the particular implementation of the invention and can be chosen using known design methods.

The reception controller 120, all or part of which is normally integrated into the processing system 106, converts the ultrasonic radio frequency return signals into a lower frequency range for processing and may also include analog-to-digital conversion circuitry. The reception controller 120 performs down conversion on the received ultrasonic radio frequency return signals. Down conversion is the process of mixing a single channel of sampled radio frequency data with two oscillator signals, such as sine waves, that are 90° out of phase with each other, thus producing two output signals in quadrature. The down conversion process outputs two baseband signals—a baseband in-phase output signal I(n), and a baseband quadrature output signal Q(n). The baseband signals I(n) and Q(n) are produced according to the relationships shown below.

$$I(n)=R(n)\cos(2\pi\phi(n)) \quad (1)$$

$$Q(n)\%=R(n)\sin(2\pi\phi(n)) \quad (2)$$

where:
n=number of samples along a beamline;
$\phi(n)=\phi(n-1)+\Delta\phi+(n)$;
$\phi(0)=\phi_0$, a programmable constant phase;
$\Delta\phi(n)$=instantaneous frequency;
I(n)=baseband in-phase output signal;
Q(n)=baseband quadrature output signal; and
R(n)=sampled RF input signal.

The number of samples n along a beamline can be any number as desired, but is suitably a large number of samples, such as about 1,000.

In systems that generate a representation of the interrogation region 116 as a pattern of brightness or signal intensity signals, the down-converted power signals for the two-dimensional interrogation region 116 are stored in a memory 122 as frame data after conventional beam forming. An intensity-determining portion 124 of the processing system 106 may be included to perform the conventional calculations necessary for relating returned echo signal strengths to a predetermined range of intensity signals.

The Doppler shifts and/or power Doppler spectra for the various echo signals are also determined with necessary conventional calculations being performed in a Doppler/velocity determining portion 126 of the processing system 106. The Doppler/velocity determining portion 126 performs zero-lag and single-lag autocorrelation calculations on the wall-filtered baseband signals (I(n) and Q(n)) determined from the beamline samples. The zero-lag component is the total power of the signal, and is calculated according to the equation:

$$P(m) = \Phi_0(m) = \sum_{k=0}^{K-1} (I^2_{k,m} + Q^2_{k,m}) \qquad (3)$$

where m is the number of samples along a beamline and k is the number of times that a beamline is generated. A suitable number for K is on the order of about 12. It will be appreciated that the number of samples m is suitably less than the number of baseband samples n, because fewer samples are available for processing due to conventional processing and filtering after formation of the baseband signals I(n) and Q(n). For example, m is suitably on the order of about 500 samples.

The single-lag component is a complex signal that has real (in-phase) and imaginary (quadrature) components are denoted by D and N, respectively. The autocorrelation components N and D are calculated according to the equation:

$$\Phi_1(m) = \sum_{k=0}^{K-2} (I_{k,m}I_{k+1,m} + Q_{k,m}Q_{k+1,m}) + \qquad (4)$$
$$j \sum_{k=0}^{K-2} (I_{k,m}Q_{k+1,m} - I_{k+1,m}Q_{k,m}) = D(m) + jN(m)$$

Because subsequent processing of color flow data in rectangular coordinates is complicated and is therefore not desirable, the Doppler/velocity determining portion 126 converts the autocorrelation components D(m) and N(m) from rectangular coordinates to polar coordinates. A Doppler phase shift $\phi(m)$ is calculated from D(m) and N(m) as shown below.

$$\phi(m) = \tan^{-1}\left(\frac{N(m)}{D(m)}\right) \qquad (5)$$

The Doppler phase shift $\phi(m)$ is representative of flow velocity, and is hereinafter referred to as a velocity $\phi$. A magnitude R(m) of the autocorrelation is calculated as shown below.

$$R(m) = \sqrt{d(m)^{2} + N(m)^2} \qquad (6)$$

The magnitude R(m) of the autocorrelation is hereinafter referred to as a magnitude R.

The digital filter used to selectively and variably smooth color flow images in the system 100 is implemented by a flow processor 128 that is suitably part of the processing system 106. The flow processor 128 retrieves the color flow input signal received from the Doppler/velocity determining portion 126 and stores it within the memory 122. The flow processor 128 retrieves filter coefficients from the memory 122 and then operates on the received input signals from the Doppler/velocity determining portion 126, as will be discussed in detail below. The Doppler phase shift (velocity)$\phi$ and the magnitude R are converted back to rectangular coordinates N and D for subsequent scan conversion as shown below:

$$D = R\cos\phi \qquad (7)$$
$$N = R\sin\phi \qquad (8)$$

Each frame of the image to be displayed is an array of acoustic power, intensity, or velocity vectors for the image elements that make up the frame. Thus, color flow information is overlaid onto a B-mode image. Each set of frame data corresponds to one image frame. The interrogation region 116 is normally not the same shape that the user wants to see displayed. The signals that make up the frame data are normally not in a form suitable for driving a conventional gray-tone or colored display. The signals for an image frame are therefore applied to a conventional scan converter 130 that converts the signals into display intensity signals suitable for use in driving a display device 140.

The display device 140 typically includes, or is connected to, a conventional display driver 142 and includes a screen 144 (for example, light-emitting diode or cathode ray tube) that is divided into an x–y (or polar) matrix or pattern of picture elements or "pixels" that make up an image that the user can view and interpret. The displayed image element will often be made up of more than one pixel, but this will depend upon the resolution of the display device 140.

Exemplary Flow Processor

Figure 1:
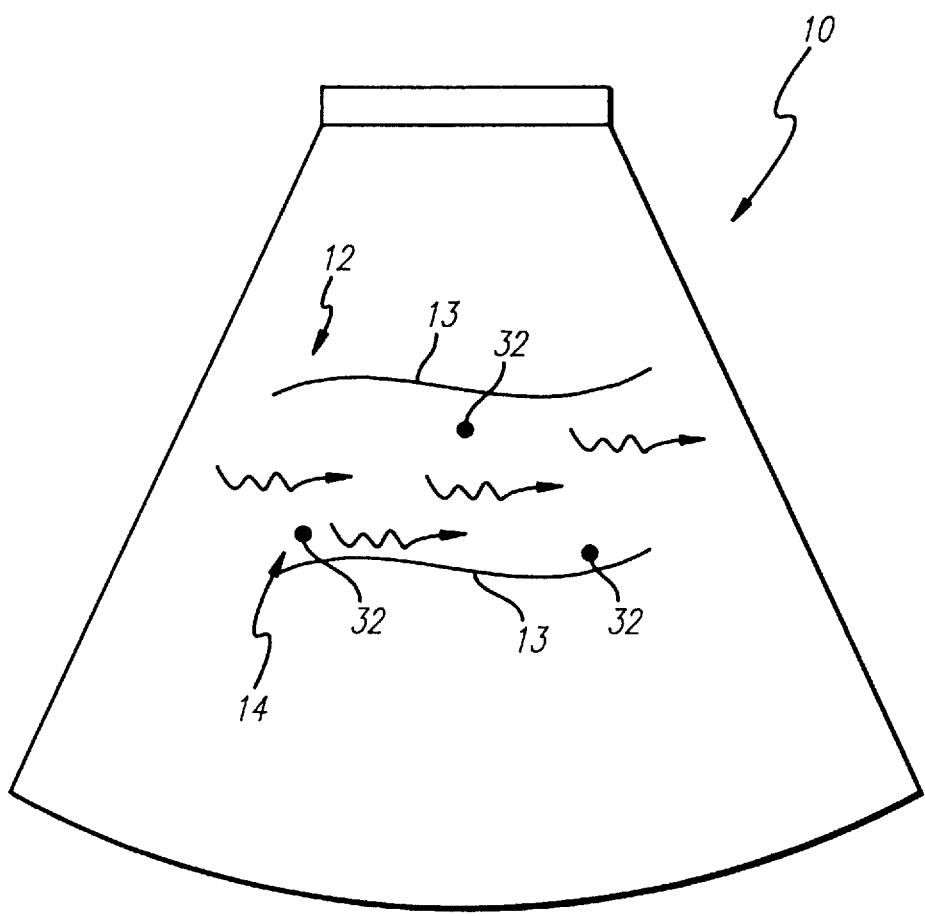
FIG. 1 illustrates how an ultrasound color flow image is created.
Figure 2:
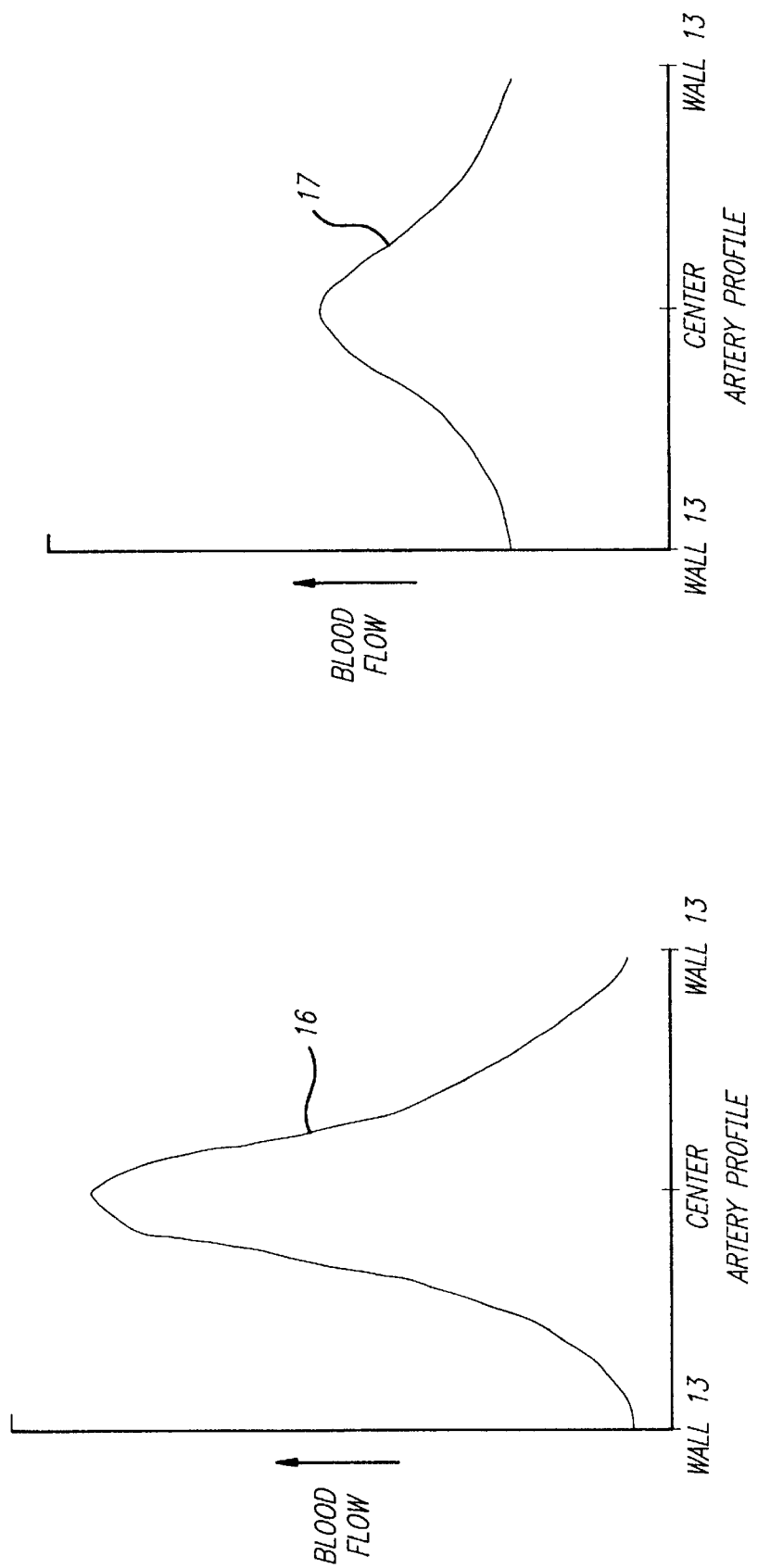
FIG. 2A illustrates a color flow ultrasound image.
FIG. 2B illustrates a smeared color flow ultrasound image.

As shown in FIG. 4A, three adjacent beamlines l, l–1 and l–2 are shown. Three samples m, m–1, and m–2 are shown along each beamline. In a presently preferred embodiment of the invention, a sample A, that is the sample m–1 along the beamline l–1, is the sample that is being processed at any given time by the flow processor 128. As will be discussed below, an average velocity $\phi_{av}$, an average magnitude of autocorrelation $R_{av}$, and an average power $P_{av}$ are calculated from the samples adjacent the sample A, and the components of the sample A are compared to a velocity threshold, a magnitude of autocorrelation threshold, and a power threshold. If all the component signals of the sample A, that is the velocity signal, the magnitude of autocorrelation signal, and the power signal, are less than the velocity threshold, the magnitude of autocorrelation threshold, and the power threshold, then the sample A is most likely an anomaly, such as a flow hole or a random noise. In that case, the average velocity, the average magnitude of autocorrelation, and the average power are used in place of the components of the sample A. When any one of the components of the sample A, that is the velocity signal, the magnitude of autocorrelation signal, or the power signal, is greater than the velocity threshold, the magnitude of autocorrelation threshold, and the power threshold, then the sample A is most likely a valid sample and is not an anomaly. For example, the sample A may be taken in a region of high flow, such as near the middle of the artery 12 as shown in FIG. 2A. In this case, the component signals of the sample A are of sufficient magnitude such that smoothing is not desired. According to the present invention, smoothing is not performed, and smearing caused by conventional smoothing, such as the smearing shown in FIG. 2B, is avoided. In this case, the component signals of the sample A are used rather than the average velocity, the average magnitude of autocorrelation, and the average power. Thus, the present invention takes flow conditions into consideration when performing smoothing, smoothes the color flow signals only when desired, and avoids the smearing produced by conventional averaging that is performed regardless of flow conditions.

Figure 4B:
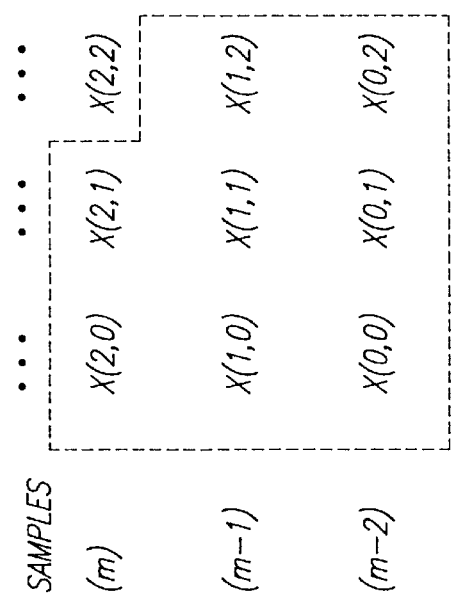
FIG. 4B is a chart of an array of signals used in the present invention.

FIG. 4B is a 2-D array of signals representing the samples of FIG. 4A. For purposes of illustration, the samples are arranged in a 3×3 array. Each sample is denoted X and includes three component signals: a velocity signal $\phi$, a magnitude of autocorrelation signal R, and a power signal P. The samples are positioned in the array of FIG. 4B so that X (0,0) is obtained from the beamline l-2 and sample m-2, X (1,0) is obtained from the beamline l-2 and the sample m-1, and X (2,0) is obtained from the beamline l-2 and the sample m. X (0,1) is obtained from the beamline l-1 and the sample m-2, X (1,1), that is the sample that is processed at any given time, is obtained from the beamline l-1 and the sample m-1, and X (2,1) is obtained from the beamline l-1 and the sample m. X (0,2) is obtained from the beamline l and the sample m-2, and X (1,2) is obtained from the beamline l and the sample m-1.

As will be discussed below, the signals that are averaged by the presently preferred flow processor 128 are those signals that are shown within the dotted line of FIG. 4B, namely, X (0,0), X (1,0), X (2,0), X (0,1), X (1,1), X (2,1), X (0,2), and X (1,2). This selection of signals to be averaged in the presently preferred embodiment results in simplified implementation of the flow processor 128, as will be appreciated from the following discussion. However, it will also be appreciated that the signal X (2,2), obtained from the beamline l and the sample m and shown outside the dashed line in FIG. 4B may also be processed by a suitable flow processor that may be implemented without undue experimentation by one skilled in the art.

Figure 5:
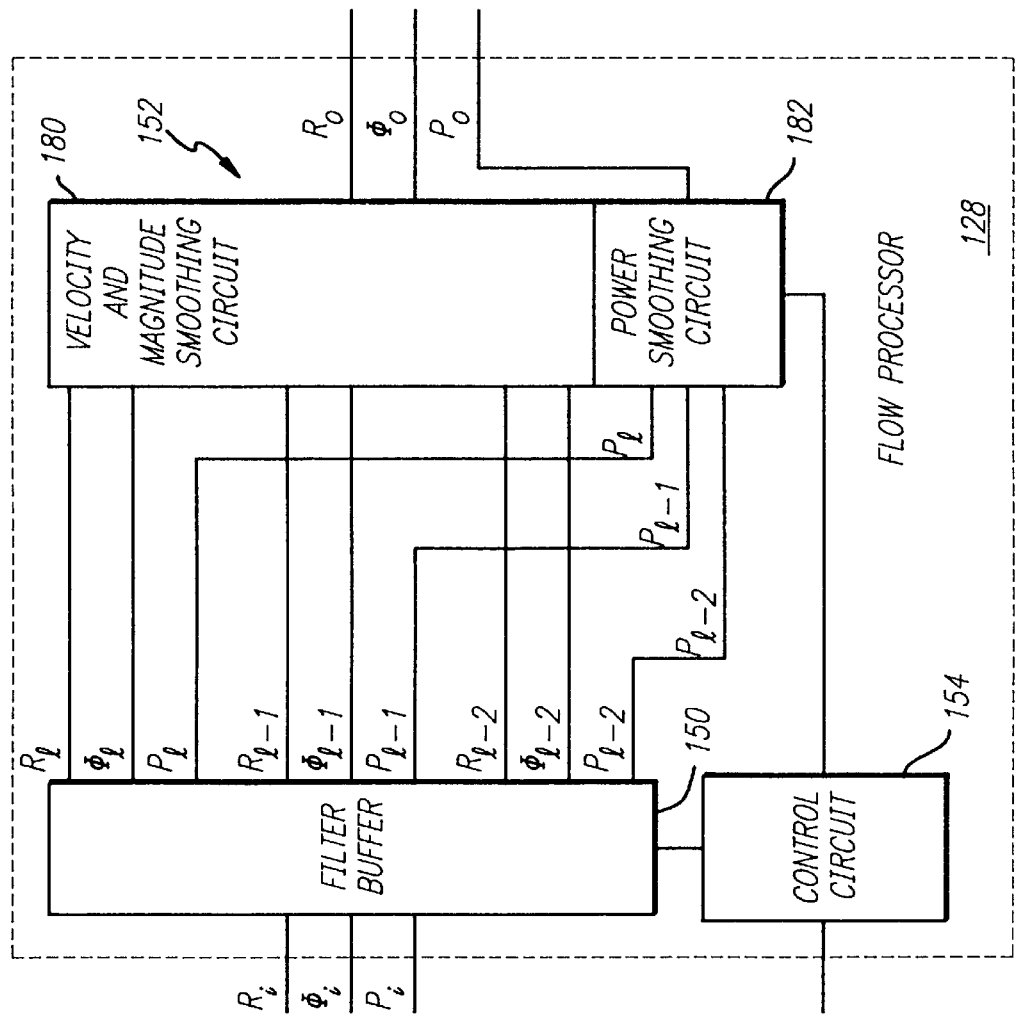
FIG. 5 is a block diagram of a flow processor according to the present invention.

FIG. 5 shows a block diagram of a presently preferred flow processor 128. The flow processor 128 includes a filter buffer 150, a digital filter 152, and a control circuit 154. As will be discussed in detail below, the filter buffer 150 receives input signals $\phi_i$, $R_i$, and $P_i$ from the Doppler/intensity determining portion 126 and outputs the output signals $\phi_o$, $R_o$ and $P_o$, all under the control of the control circuit 154.

Figure 6:
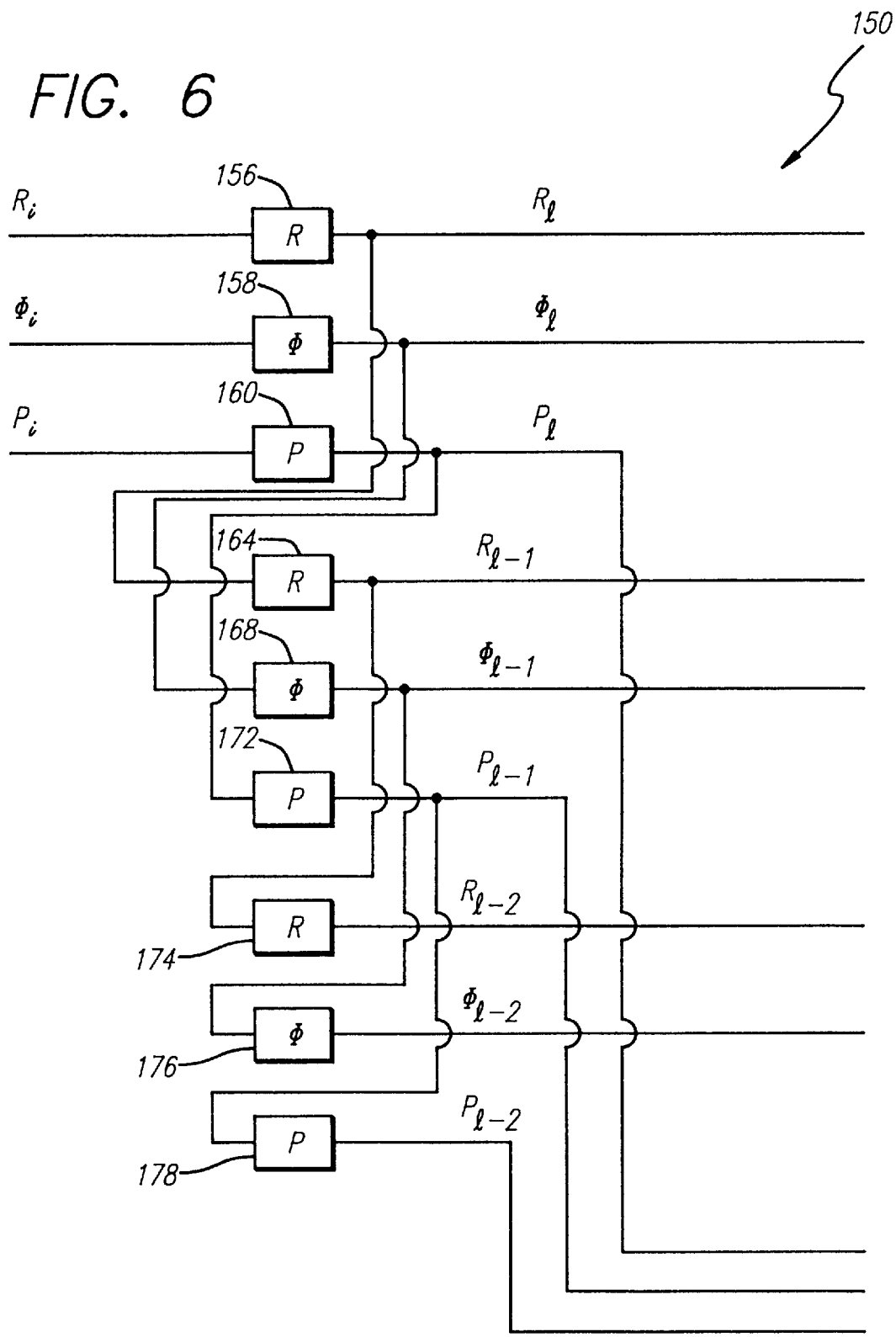
FIG. 6 is a detailed block diagram of a portion of the flow processor of FIG. 5.

FIG. 6 shows a detailed block diagram of the filter buffer 150. The filter buffer 150 includes storage capacity sufficient to store three adjacent beamlines' l, l-1, and l-2 worth of sample data. The filter buffer 150 suitably includes nine memory blocks of any acceptable type of volatile memory, such as random access memory (RAM). The memory blocks suitably operate in a first-in, first-out (FIFO) manner, as is well-known in the art.

The filter buffer 150 includes three memory blocks 156, 158, and 160. The memory block 156 inputs the magnitude signal $R_i$ and outputs a magnitude signal $R_1$ to the digital filter 152; the memory block 158 inputs the velocity signal $\phi_i$ and outputs a velocity signal $\phi_1$ to the digital filter 154; and the memory block 160 inputs the power signal $P_i$ and outputs a power signal $P_1$ to the digital filter 154. Here, l represents the beamline, or color vector, being input to the flow processor 128. However, as discussed above, the beamline l is not the beamline being processed by the digital filter 152. Instead, a delay is introduced such that the beamline l-1 is the beamline being processed by the digital filter 152.

The output of the memory block 156 is coupled to a memory block 164 that outputs a magnitude signal $R_{l-1}$ to the digital filter 152. The output of the memory block 158 is coupled to a memory block 168 that outputs a velocity signal $\phi_{l-1}$ to the digital filter 152. The output of the memory block 160 is coupled to a memory block 172 that outputs a power signal $P_{l-1}$ to the digital filter 152. Here, l-1 represents the beamline being processed by the flow processor 128.

A memory block 174 is coupled to receive the magnitude signal $R_{l-1}$ from the memory block 164, and outputs a magnitude signal $R_{l-2}$ to the digital filter 152. A memory block 176 is coupled to receive the velocity signal $\phi_{l-1}$ from the memory block 168, and outputs a velocity signal $\phi_{l-2}$ to the digital filter. A memory block 178 is coupled to receive the power signal $P_{l-1}$ from the memory block 172, and outputs a power signal $P_{l-2}$ to the digital filter.

Referring back to FIG. 5, the digital filter 152 includes a velocity and magnitude smoothing circuit 180 and a power smoothing circuit 182. The velocity and magnitude smoothing circuit 180 includes a velocity smoothing filter 184 (FIG. 7) that operates on velocity signals and a magnitude of autocorrelation smoothing filter 252 FIG. 7) that operates on magnitude of autocorrelation signals. The velocity and magnitude smoothing circuit 180 and the power smoothing circuit 182 are acceptable microprocessors known in the art that are suitably programmed to implement the present invention, such as a suitably programmed Xilinx XC4006 device. However, those skilled in the art will appreciate that other, equivalent devices may suitably be used.

Figure 7A:
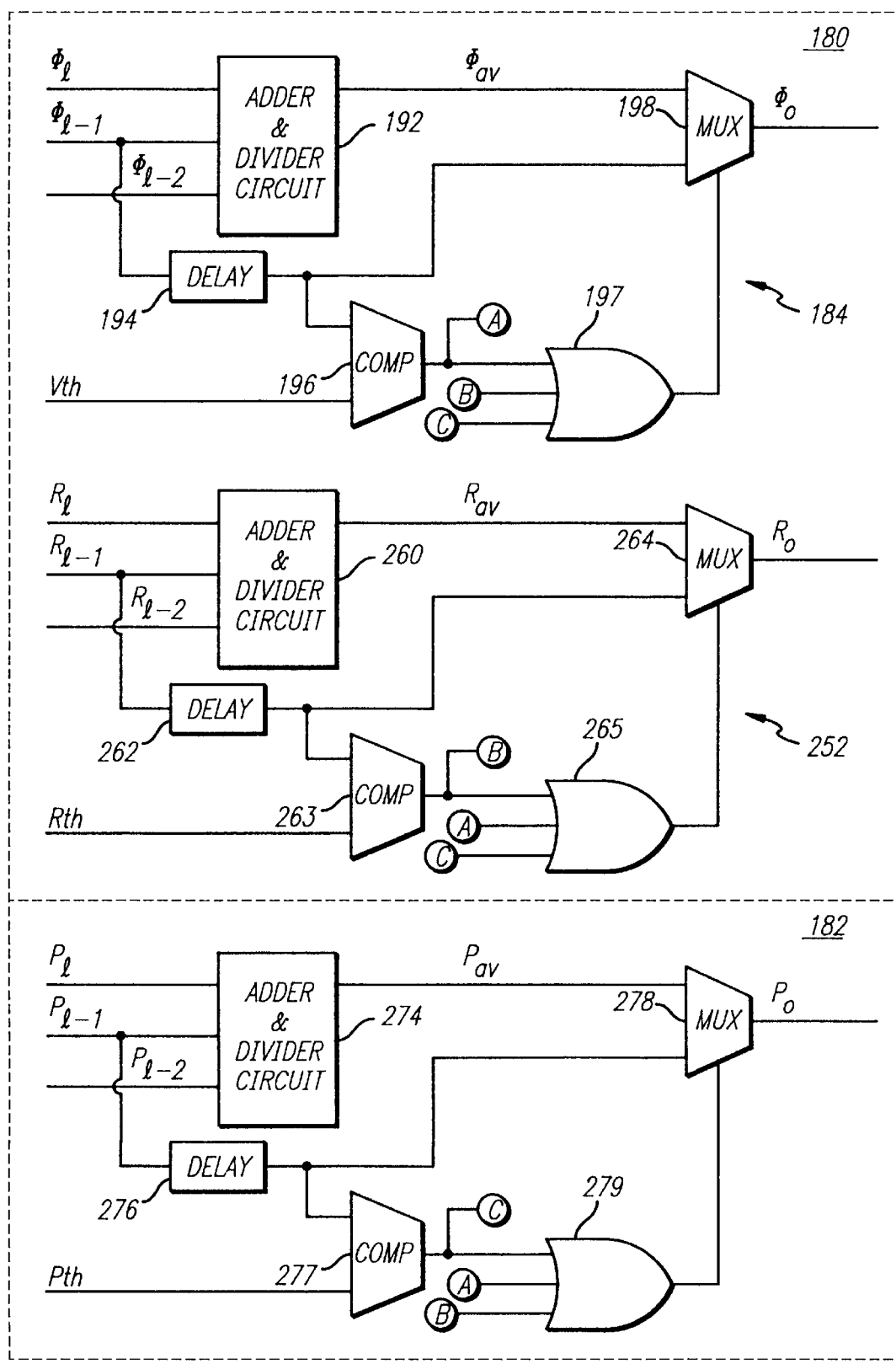
FIG. 7A is a detailed block diagram of an alternative implementation of the block diagram of FIG. 7.
Figure 7B:
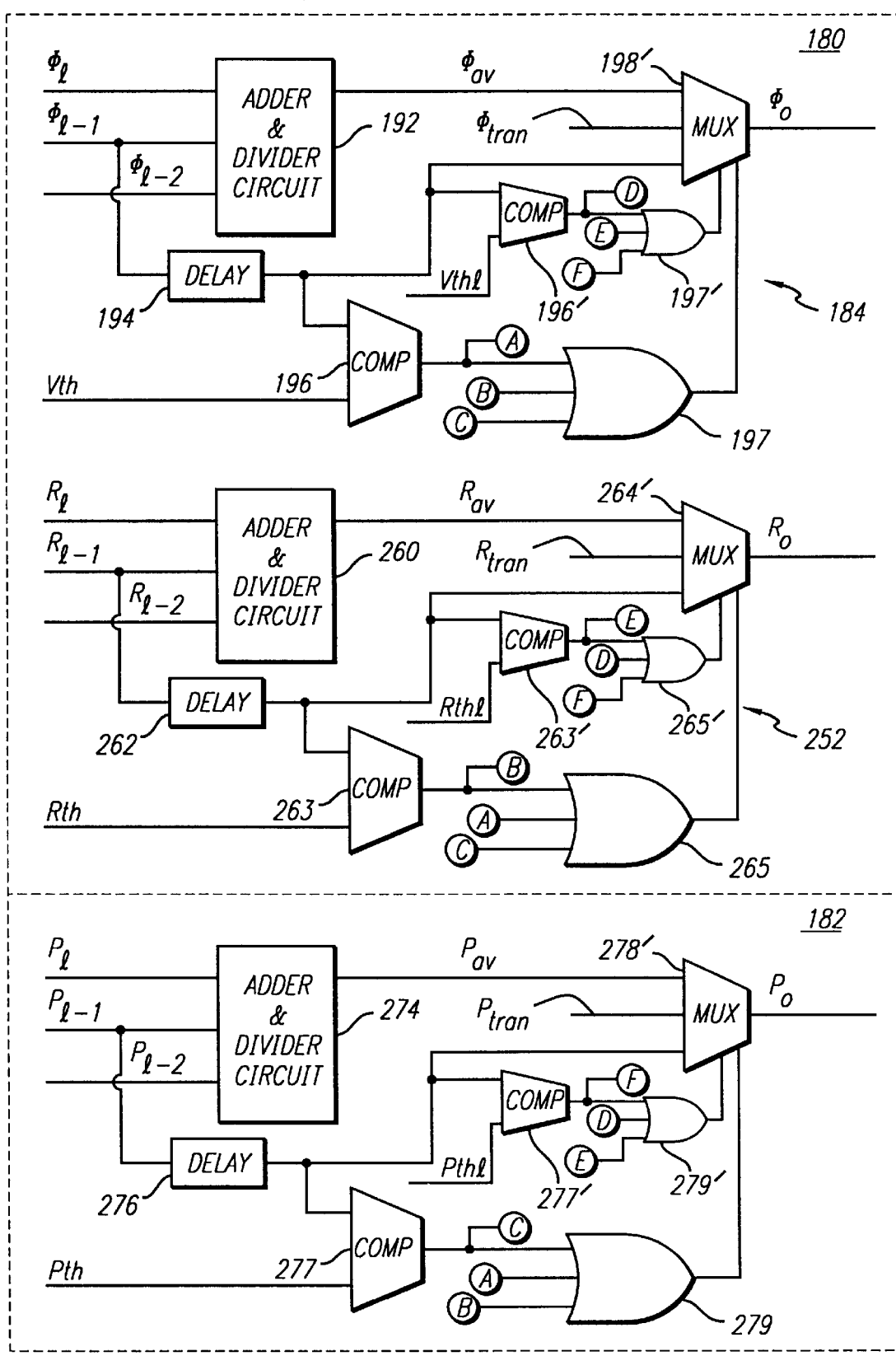
FIG. 7 is a detailed block diagram of another portion of the flow processor of FIG. 5.

FIG. 7 shows a block diagram of the digital filter 152. An adder and divider circuit 192 is coupled to receive the signals $\phi_l$, $\phi_{l-1}$, and $\phi_{l-2}$ from the memory blocks 158, 168 and 176, respectively (FIG. 6). The adder and divider circuit 192 averages the velocity signals $\phi_l$, $\phi_{l-1}$, and $\phi_{l-2}$ by performing addition and division operations. Details of a presently preferred embodiment of the adder and divider circuit 192 will be discussed below. In a presently preferred embodiment, the adder and divider circuit 192 adds velocity signals contained within the dashed line of FIG. 4B and divides the sum by eight to compute an average velocity $\phi_{av}$ as shown below:

$$\phi_{av} = \frac{\phi(0,0) + \phi(0,1) + \phi(0,2) + \phi(1,0) + \phi(1,1) + \phi(1,2) + \phi(2,0) + \phi(2,1)}{8} \qquad (9)$$

As Equation 9 illustrates, the preferred embodiment of the invention uses an eight-sample kernel. The advantage of this kernel size is that it is computationally efficient. It provides enough samples to create a statistically reliable average value, yet allows for rapid division, since eight is a power of two and division by eight can be implemented using a fast shift operation. Furthermore, by selecting eight values from a three-by-three array, the computed average can be assigned to an actual sample position, that is, to the center point of the array.

Other kernel sizes may, however, also be chosen, depending on the available processing speed and the geometrical distribution of the samples in the kernel. For example, all nine values in the three-by-three array may be used to compute the average, although this would require slower division by nine. Even larger arrays may be averaged as long as the necessary computations can be performed fast enough.

One might also use a sample array with an even number of samples on a side, such as a four-by-four sample kernel. In the case of a four-by-four array, an average value can be computed rapidly (since sixteen is also a power of two), but then the average would relate to a non-sampled point in the middle of the center four sample points. The average value could then, for example, be assigned to one of the centermost points by some weighted interpolation, or the average values of two or more adjacent but diagonally displaced arrays could be combined, for example, by averaging the averages themselves and assigning the computed value to the actual sample point mid-way between the two computed midpoints of the adjacent arrays.

Referring now to FIGS. 6 and 7, the memory block 168 is connected to provide the signal $\phi_{l-1}$ to an input terminal of a delay device 194. An output terminal of the delay device 194 is coupled to an input terminal of a comparator 196. Another input terminal of the comparator 196 is coupled to receive a velocity threshold signal $V_{th}$. The velocity threshold signal $V_{th}$ is suitably generated in a known manner by the control circuit 154 (FIG. 5). The magnitude of the velocity threshold signal $V_{th}$ may be adjusted as desired. When the magnitude of the signal $\phi_{l-1}$ is less than the magnitude of the velocity threshold signal $V_{th}$, the output signal of the comparator 196 goes to a suitable level indicative of a low logic state. Conversely, when the magnitude of the signal $\phi_{l-1}$ is greater than or equal to the magnitude of the velocity threshold signal $V_{th}$, the output of the comparator 196 goes to a suitable level indicative of a high logic state.

An adder and divider circuit 260 is coupled to receive the signals $R_l$, $R_{l-1}$, and $R_{l-2}$ from the memory blocks 156, 164, and 174, respectively. The construction of the adder and divider circuit 260 is similar to the construction of the adder and divider circuit 192, with the exception that the adder and divider circuit 260 operates on magnitude of autocorrelation signals, rather than velocity signals, to compute an average magnitude of autocorrelation as shown below:

$$R_{av} = \frac{R(0,0) + R(0,1) + R(0,2) + R(1,0) + R(1,1) + R(1,2) + R(2,0) + R(2,1)}{8} \quad (10)$$

Therefore, details of the construction and operation of the adder and divider circuit 260 will not be discussed. The output of the adder and divider circuit 260 is an average magnitude of correlation signal $R_{av}$.

The memory block 164 is connected to provide the signal $R_{l-1}$ to an input terminal of a delay device 262. An output terminal of the delay device 262 is coupled to an input terminal of a comparator 263. Another input terminal of the comparator 263 is coupled to receive a magnitude threshold signal $R_{th}$. The magnitude threshold signal $R_{th}$ is suitably generated in a known manner by the control circuit 154 (FIG. 5). The magnitude threshold signal $R_{th}$ may be adjusted as desired. When the magnitude of the signal $R_{l-1}$ is less than the magnitude threshold signal $R_{th}$, the output signal of the comparator 263 goes to a suitable level indicative of a low logic state. Conversely, when the magnitude of the signal $R_{l-1}$ is greater than or equal to the magnitude threshold signal $R_{th}$, the output of the comparator 263 goes to a suitable level indicative of a high logic state.

An adder and divider circuit 274 is coupled to receive the signals $P_l$, $P_{l-1}$, and $P_{l-2}$ from the memory blocks 160, 172, and 178, respectively FIG. 6). The construction of the adder and divider circuit 274 is also similar to the construction of the adder and divider circuit 192, with the exception that the adder and divider circuit 274 operates on power signals, rather than velocity signals, to compute an average power as shown below:

$$P_{av} = \frac{P(0,0) + P(0,1) + P(0,2) + P(1,0) + P(1,1) + P(1,2) + P(2,0) + P(2,1)}{8} \quad (11)$$

Therefore, details of the construction and operation of the adder and divider circuit 274 will not be discussed. The output of the adder and divider circuit 274 is an average power signal $P_{av}$.

The memory block 172 is connected to provide the signal $P_{l-1}$ to an input terminal of a delay device 276. An output terminal of the delay device 276 is coupled to an input terminal of a comparator 277. Another input terminal of the comparator 277 is coupled to receive a power threshold signal $P_{th}$. The power threshold signal $P_{th}$ is suitably generated in a known manner by the control circuit 154 FIG. 5). The power threshold signal $P_{th}$ may be adjusted as desired. When the magnitude of the signal $P_{l-1}$ is less than the power threshold signal $P_{th}$, the output signal of the comparator 277 goes to a suitable level indicative of a low logic state. Conversely, when the magnitude of the signal $P_{l-1}$ is greater than or equal to the power threshold signal $P_{th}$, the output of the comparator 277 goes to a suitable level indicative of a high logic state.

The output from the comparator 196 is provided to an input terminal of an OR gate 197. Another input terminal of the OR gate 197 is coupled to receive the output of the comparator 263. Another input terminal of the OR gate 197 is coupled to receive the output of the comparator 277.

A control terminal of a multiplexer 198 is coupled to receive the output signal from the OR gate 197. The signal $\phi_{l-1}$ is provided to an input terminal of the multiplexer 198. Another input of the multiplexer 198 is connected to receive the average velocity signal $\phi_{av}$. The output of the multiplexer 198 is an output velocity signal $\phi_o$. When the output signal of the OR gate 197 is low, the output velocity signal $\phi_o$ of the multiplexer 198 is the average velocity signal have and when the output signal of the OR gate 197 is high, the output velocity signal $\phi_o$ from the multiplexer 198 is the signal $\phi_{l-1}$. The multiplexer 198 is any suitable multiplexer that is well-known in the art.

The output from the comparator 263 is provided to an input terminal of an OR gate 265. Another input terminal of the OR gate 265 is coupled to receive the output from the comparator 196. Another input terminal of the OR gate 265 is coupled to receive the output from the comparator 277.

A control terminal of a multiplexer 264 is coupled to receive the output signal from the OR gate 265. The signal $R_{l-1}$ is connected to an input terminal of the multiplexer 264. Another input terminal of the multiplexer 264 is connected to receive the average magnitude of autocorrelation signal $R_{av}$. The output of the multiplexer 264 is an output magnitude signal $R_o$. When the output signal of the OR gate 265 is low, the output magnitude signal $R_o$ of the multiplexer 264 is the average magnitude signal $R_{av}$, and when the output signal of the OR gate 265 is high, the output magnitude signal $R_o$ from the multiplexer 264 is the signal $R_{l-1}$. The multiplexer 264 is also any suitable multiplexer that is well-known in the art.

The output from the comparator 277 is provided to an input terminal of an OR gate 279. Another input terminal of the OR gate 279 is coupled to receive the output from the comparator 196. Another input terminal of the OR gate 279 is coupled to receive the output from the comparator 263.

A control terminal of a multiplexer 278 is coupled to receive the output signal from the OR gate 279. The signal $P_{l-1}$ is connected to an input terminal of the multiplexer 278.

Another input terminal of the multiplexer 278 is connected to receive the average power signal $P_{av}$. The output of the multiplexer 278 is an output power signal $P_o$. When the output signal of the OR gate 279 is low, the output power signal $P_o$ of the multiplexer 277 is the average power signal $P_{av}$, and when the output signal of the OR gate 279 is high, the output power signal $P_o$ from the multiplexer 278 is the signal $P_{l-1}$. The multiplexer 278 is also any suitable multiplexer that is well-known in the art.

FIG. 7A shows a detailed block diagram of an alternative implementation of the digital filter 152 that provides a transitional smoothing function. As shown in FIG. 7A, a weighted average is computed that provides a transition between the values $\phi(1,1)$ and $\phi_{av}$, R (1,1) and $R_{av}$, and P (1,1) and $P_{av}$. The control circuit 154 (FIG. 5) provides a velocity threshold $V_{th1}$, a magnitude threshold $R_{th1}$, and a power threshold $P_{th1}$. The velocity threshold $V_{th1}$ and the signal $\phi(1,1)$, that is output from the delay device 194, are input to a comparator 196'. The threshold $R_{th1}$ and the signal R (1,1), that is output from the delay device 262, are input to a comparator 263'. The threshold $P_{th1}$ and the signal P (1,1), that is output from the delay device 276, are input to a comparator 277'. The outputs from the comparators 196', 263', and 277' are all input to OR gates 197', 265', and 279'. Similar to the operation of the digital filter 152 (FIG. 7), when the signals $\phi(1,1)$, R(1,1), and P(1,1) are less than the thresholds $V_{th1}$, $R_{th1}$, and $P_{th1}$, respectively, the outputs of the comparators 196', 263' and 277' go to a suitable value indicative of a low logic state.

The output of the OR gate 197' is provided to a second control terminal of a multiplexer 198'. The multiplexer 198' has a third input terminal connected to receive a transient signal $\phi_{tran}$. The transient signal $\phi_{tran}$ is a weighted average that is computed by the flow processor 128 as shown below:

$$\phi_{tran} = \frac{(\phi(1,1) - V_{th1})\phi(1,1) + (V_{th} - \phi(1,1))\phi_{av}}{V_{th} - V_{th1}} \quad (12)$$

The multiplexer 198' is controlled as follows. When the output of the OR gate 197 is high, the multiplexer 198' outputs the signal $\phi(1,1)$ regardless of the output of the OR gate 197'. When the output of the OR gate 197 is low and the output of the OR gate 197' is also low, then the multiplexer 198' outputs the average velocity $\phi_{av}$, However, when the output of the OR gate 197 is low and the output of the OR gate 197' is high, then the multiplexer 198' outputs the weighted average velocity signal $\phi_{tran}$. The multiplexers 264' and 278' are configured similarly to the multiplexer 198' except the multiplexers 264' and 278' operate on magnitude of autocorrelation signals and power signals, respectively. Thus, when each of the signals $\phi(1,1)$, R(1,1), and P(1,1) is less than the thresholds $\phi_{th}$, $R_{th}$, and $P_{th}$, but any one of the signals $\phi(1,1)$, R(1,1) or P(1,1) is less than the thresholds $\phi_{th1}$, $R_{th1}$, or $P_{th1}$, respectively, the multiplexers 198', 264', and 278' output the weighted average signals $\phi_{tran}$, $R_{tran}$, $P_{tran}$, respectively, where $R_{tran}$ and $P_{tran}$ are computed as shown below:

$$R_{tran} = \frac{(R(1,1) - R_{th1})R(1,1) + (R_{th} - R(1,1))R_{av}}{R_{th} - R_{th1}} \quad (13)$$

$$P_{tran} = \frac{(P(1,1) - P_{th1})P(1,1) + (P_{th} - P(1,1))P_{av}}{P_{th} - P_{th1}} \quad (14)$$

FIG. 8A shows a detailed block diagram of a presently preferred adder and divider circuit 192. The adder and divider circuit 192 includes a delay section 200 and an adder section 202. The delay section 200 provides velocity signals to the adder section 202 in a manner that implements the array of signals of FIG. 4B. The delay section 200 inputs the velocity signal $\phi_1$ to a branch 204 of cascaded delay devices 206 and 208 that include any acceptable flip-flop. The velocity signal $\phi_{l-1}$ is input to a branch 212 of cascaded delay devices 214 and 216 that also include any acceptable flip-flop. The velocity signal $\phi_{l-2}$ is input to a branch 222 of cascaded delay devices 224 and 226 that also include any acceptable flip-flop. It will be appreciated that the adder and divider circuits 260 and 274 are similar to the adder and divider circuit 192, except the adder and divider circuit 260 operates on magnitude of autocorrelation signals and the adder and divider circuit 274 operates on power signals.

The adder section 202 includes adder stages that are arranged to receive the delayed signals from the delay section and to output the average velocity signal $\phi_{av}$. The adder section 202 is controlled by clock pulses from the control circuit 154. An adder stage 238 has an input terminal coupled to receive the signal $\phi(0,0)$ from the output of the delay device 226, and another input terminal coupled to receive the signal $\phi(0,1)$ from the output of the delay device 224. The output of the adder stage 238 is coupled to an input terminal of an adder stage 240. The adder stage 240 has another input terminal coupled to receive the signal $\phi(1,0)$ from the output of the delay device 216. The output of the adder stage 240 is coupled to an input terminal of an adder stage 242. The adder stage 242 has another input terminal coupled to receive the signal $\phi(1,1)$ from the output of the delay device 214. The output of the adder stage 242 is coupled to an input terminal of an adder stage 244. The adder stage 244 has another input terminal coupled to receive the signal $\phi(2,0)$ from the output of the delay device 208. The output of the delay device 244 is coupled to an input terminal of an adder stage 246. The adder stage 246 has another input terminal coupled to receive the signal $\phi(2,1)$ from the output of the delay device 206. The output of the adder stage 246 is coupled to an input terminal of an adder stage 248. The adder stage 248 has another input terminal coupled to receive the signal $\phi(0,2)$ from the input of the delay device 224. The output of the adder stage 248 is coupled to an input terminal of an adder stage 250. The adder stage 250 has another input terminal coupled to receive the signal $\phi(1,2)$ from the input of the delay device 214. The output of the adder stage 250 is the average velocity $\phi_{av}$. It will again be appreciated that the construction of the adder and divider circuits 260 and 274 are similar to the construction of the optional adder and divider circuits 192, except the adder and divider circuit 260 operates on magnitude of autocorrelation signals and the adder and divider circuit 274 operates on power signals.

Figure 8B:
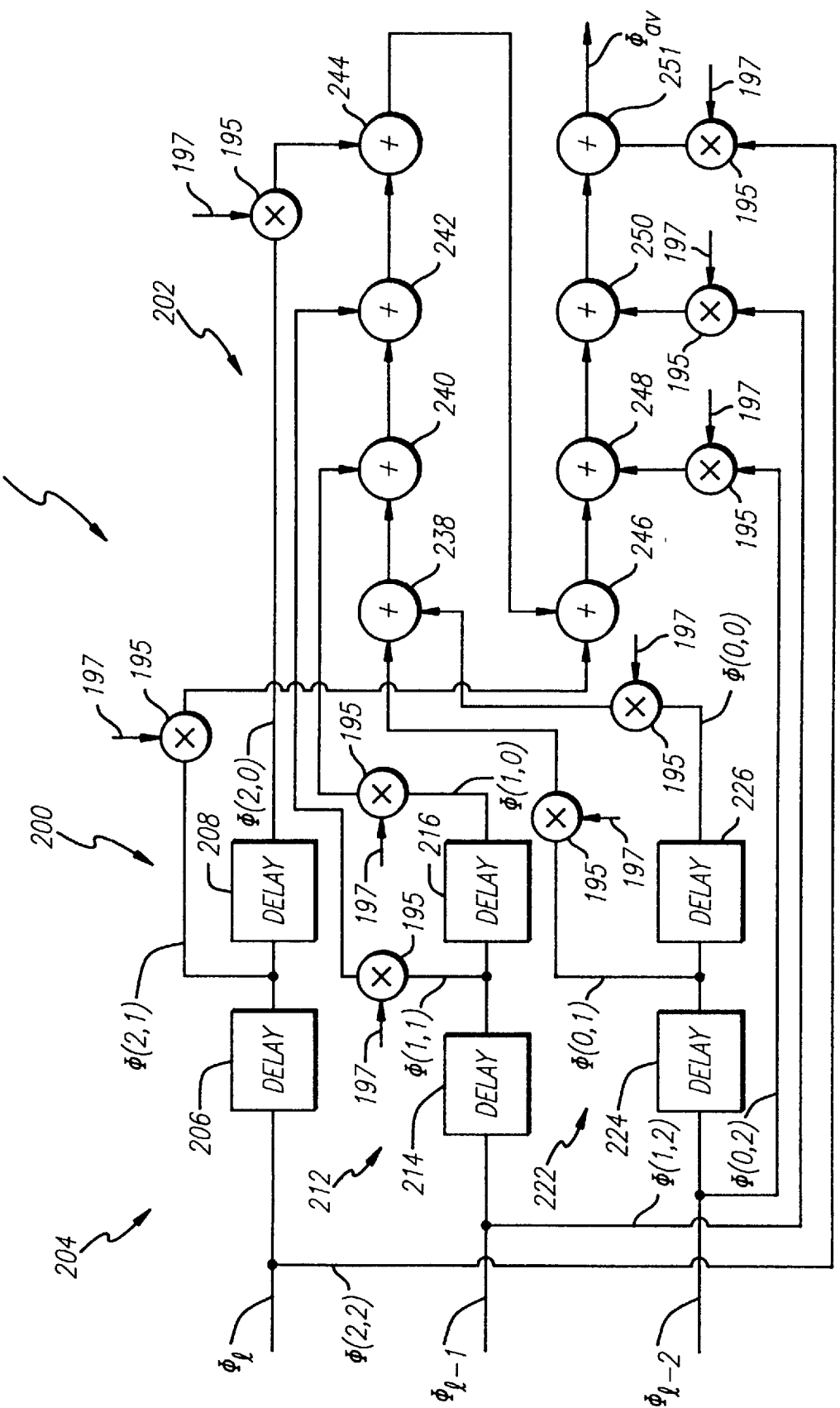
FIG. 8B is a block diagram of an alternative implementation of the block diagram of FIG. 8A.

FIG. 8B shows an optional adder and divider circuit 193. The optional adder and divider circuit 193 includes multipliers 195 disposed between the delay section 200 and the adder section 202 for introducing weighting coefficients 197. The weighting coefficients are suitably rectangular coefficients, Gaussian coefficients, or triangular coefficients, and may be selected as desired. The coefficients 197 are suitably stored in the memory 122 and are input to the multipliers 195 under the control of the control circuit 154. The optional adder and divider circuit 193 permits the amount of smoothing to be carried as desired by varying the weighting coefficients 197 applied to the signals added in the adder section 202. The signal $\phi(2,2)$ is provided from the input of the delay device 206 to a multiplier 195 that multiplies the signal $\phi(2,2)$ by a coefficient 197. The output of the multiplier 195 is coupled to an input terminal of an adder stage 251. Another input of the adder stage 251 is coupled to receive the output from the adder stage 250. The output from the adder stage 251 is the average velocity $\phi_{av}$.

It will again be appreciated that the adder and divider circuits 260 and 274 may be implemented as optional adder and divider circuits that are similar to the optional adder and divider circuit 192.

The flow processor 128 performs its selective and variable smoothing function as follows. Referring to FIG. 9, a flow chart is shown that summarizes a method 280 according to the present invention. The method 280 starts at a step 282, at which input signals $\phi_i$, $R_i$, and $P_i$ are received for a sample to be processed and its adjacent samples. At a step 284, the sample to be processed, that is the velocity signal $\phi(1,1)$, the magnitude of autocorrelation signal $R(1,1)$, and the power signal $P(1,1)$ is selected. As discussed above, the sample to be processed includes the signals $\phi(1,1)$, $R(1,1)$, and $P(1,1)$, and its adjacent samples are the remaining samples shown within the dashed line of FIG. 4B. At a step 284, an average velocity signal $\phi_{av}$, an average magnitude of autocorrelation signal $R_{av}$, and an average power signal $P_{av}$ are computed for the sample to be processed and the adjacent samples. At a decision step 288, a determination is made whether the selected velocity signal $\phi(1,1)$ is less than a velocity threshold, and whether the selected magnitude of autocorrelation signal $R(1,1)$ is less than a magnitude of autocorrelation threshold, and whether the selected power signal $P(1,1)$ is less than a power threshold. When all the selected signals are less than their respective thresholds, the sample to be processed is most likely an anomaly and therefore is not output for further processing. Instead, at a step 292, the average velocity signal $\phi_{av}$, the average magnitude of autocorrelation signal $R_{av}$, and the average power signal $P_{av}$ are output for further processing. The method 280 then is performed again for the next sample to be processed. When any one of the selected signals is greater than or equal to its respective threshold, then the sample to be processed most likely represents a valid sample and averaging is not desired. Accordingly, at a step 290, the sample to be processed, that is the velocity signal $\phi(1,1)$, the magnitude of autocorrelation signal $R(1,1)$, and the power signal $P(1,1)$ is output for further processing. The method 280 is then performed again for the next sample to be processed.

Figure 9A:
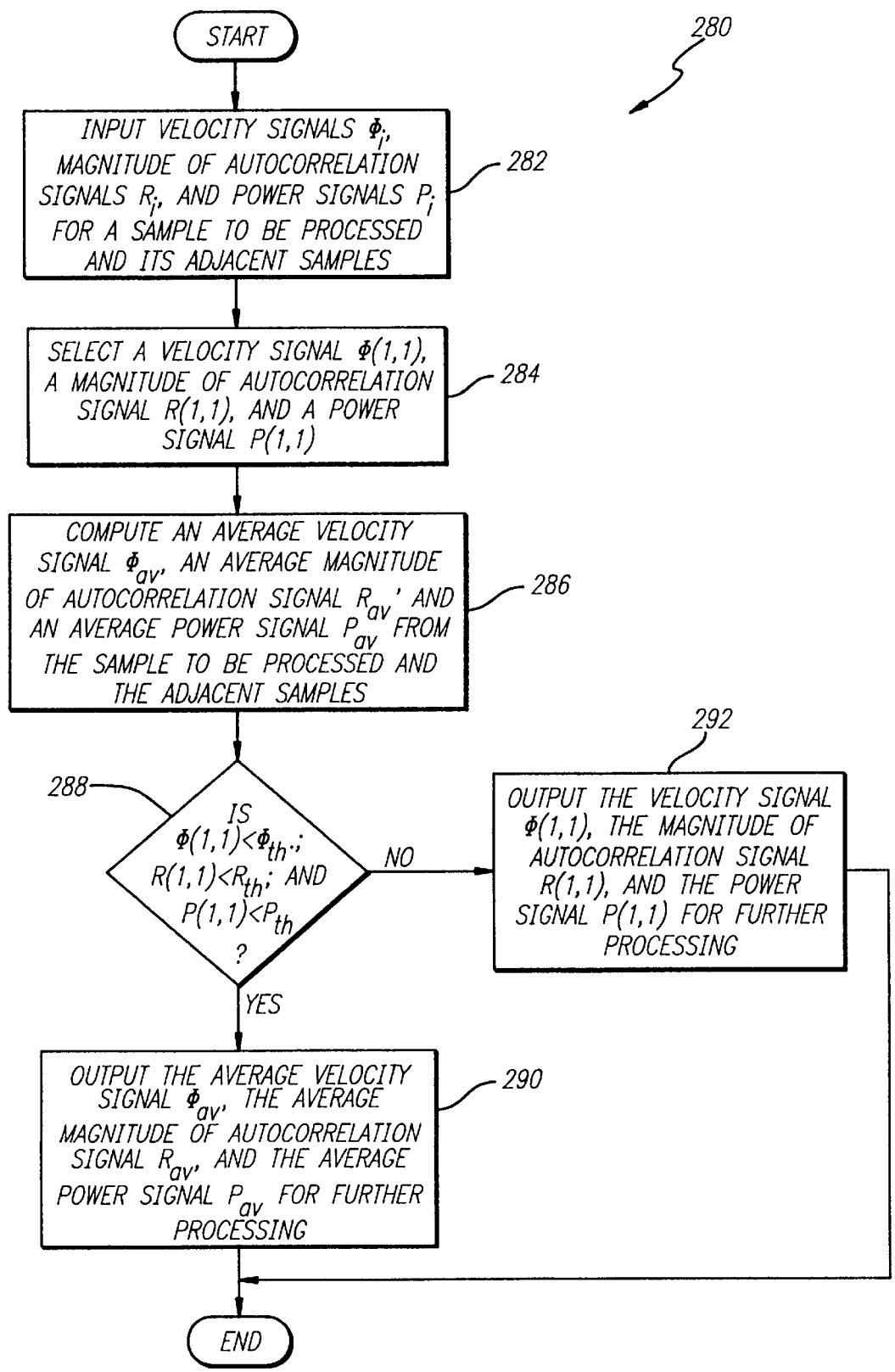
FIG. 9A is a flowchart of an alternative method according to the present invention.

FIG. 9A shows a flow chart of an alternate method 280' that provides the weighted average signals $\phi_{tran}$, $R_{tran}$, and $P_{tran}$. When the determination is made at the decision block 288 that each of the signals $\phi(1,1)$, $R(1,1)$, and $P(1,1)$ are less than their respective thresholds $\phi_{th}$, $R_{th}$, and $P_{th}$, then a determination is made at a decision block 293 whether the signals $\phi(1,1)$, $R(1,1)$, and $P(1,1)$ are less than the thresholds $\phi_{th1}$, $R_{th}$, and $P_{th1}$. When any one of the signals $\phi(1,1)$, $R(1,1)$ and $P(1,1)$ is less than its respective threshold $\phi_{th1}$, $R_{th1}$, or $P_{th1}$, then at a block 295 the weighted average signals $\phi_{tran}$, $R_{tran}$, and $P_{tran}$ are output. When each of the signals $\phi(1,1)$, $R(1,1)$, and $P(1,1)$ are less than their respective thresholds $\phi_{th1}$, $R_{th}$, and $P_{th1}$, then the method 280' continues to the block 290 where the average signals $\phi_{av}$, $R_{av}$, and $P_{av}$ are output.

The method 280 will now be explained with respect to FIGS. 5–10. Referring now to FIGS. 5 and 6, when a first beamline of data is received, the first beamline is stored in the memory blocks 156, 158 and 160. When a second beamline of data is received, the first beamline of data is output from the memory blocks 156, 158, and 160, and is input to the digital filter 152 as the signals $R_1$, $\phi_1$, and $P_1$, and to the memory blocks 164, 168, and 172, respectively. The second beamline of data is stored in the memory blocks 156, 158 and 160. When a third beamline of data is received, the first beamline of data is output from the memory blocks 164, 168, and 172 and stored in the memory blocks 174, 176, and 178, and is also sent to the digital filter 152 as the signals $R_{l-1}$, $\phi_{l-1}$ and $P_{l-1}$. The second beamline of data is output from the memory blocks 156, 158, and 160, and stored in the memory blocks 164, 168, and 172, and is also sent to the digital filter 152 as the signals $R_1$, $\phi_1$, and $P_1$. The third beamline of data is stored in the memory blocks 156, 158, and 160. When a fourth beamline of data is received, the first beamline of data is then read from the memory blocks 174, 176, and 178 and sent to the digital filter 152 as the signals $R_{l-2}$, $\phi_{l-2}$, and $P_{l-2}$. The second beamline of data is then read from the memory blocks 164, 168, and 172, is passed to the digital filter 152 as the signals $R_{l-1}$, $\phi_{l-1}$, and $P_{l-1}$, and is stored in the memory blocks 174, 176, and 178. The third beamline of data is sent to the digital filter 152 as the signals $R_1$, $\phi_1$, and $P_1$ and is stored in the memory blocks 164, 168, and 172. The fourth beamline of data is stored in the memory blocks 156, 158, and 160. This process continues as additional beamlines of data are received.

Referring now to FIGS. 7, 8A and 8B, the digital filter 152 (FIG. 5) processes the beamlines of data by performing separate operations on the velocity signal $\phi$, the magnitude signal R, and the power signal P. The beamline data is received by the velocity smoothing filter 184 as the signals $\phi_1$, $\phi_{1-1}$, $\phi_{1-2}$. As shown in FIG. 8A, the delay section 200 sends its output signals to the adder section 202 in a staggered fashion such that a sum is formed progressively by eight separate addition operations. When desired, in the optional adder and divider circuit 192 shown in FIG. 8B the output signals from the delay section 200 are multiplied by the selected weighting coefficients 197 by the multipliers 195. The sum is pipelined through the adder section 202 such that each progressive sum occupies one adder stage for every clock interval. The sum progresses down the pipeline until all additions are made and the final result appears at the output of the adder section 202 as the average velocity signal $\phi_{av}$. The average magnitude of autocorrelation signal $R_{av}$ and the average power signal $P_{av}$ are generated in a similar manner in the adder and divider circuits 260 and 274, respectively.

The output $\phi_o$ from the digital filter 152 is either the average velocity signal $\phi_{av}$ that is output from the adder and divider circuit 192, as discussed above, or the signal $\phi(1,1)$ that is output from the delay device 194. It will be appreciated from the foregoing discussion that the output of the delay device 194 is the signal $\phi(1,1)$. The signal $\phi(1,1)$ is the velocity signal of the beamline that is being processed by the flow processor, and therefore is suitably used as a velocity indicator signal that is representative of the velocity signals that are to be processed by the adder and divider circuit 192. Accordingly, the velocity signal $\phi(1,1)$ is input to the comparator 196 and is compared against the velocity threshold signal $V_{th}$. The comparator 196 controls the multiplexer 198 such that the output $\phi_o$ of the multiplexer 198 is the average velocity signal $\phi_{av}$ when the velocity signal $\phi(1,1)$ is less than the velocity threshold signal $V_{th}$. This smoothes the velocity $\phi$ in a low flow condition. Conversely, when the velocity signal $\phi(1,1)$ is greater than or equal to the velocity threshold signal $V_{th}$, the comparator 196 controls the multiplexer 198 such that the output $\phi_o$ of the multiplexer 198 is the velocity signal $\phi(1,1)$. Thus, velocity smoothing is not performed when a low flow condition is not present.

The adder and divider circuit 260 for the magnitude smoothing filter 252 and the adder and divider circuit 274 for the power smoothing filter 182 are similar to the adder and divider circuit 192 for the velocity smoothing filter 184. Thus, the adder and divider circuit 260 produces an average magnitude of autocorrelation signal $R_{av}$ and the adder and divider circuit 274 computes an average power signal $P_{av}$ in similar manners as discussed above for the computation of the average velocity signal $\phi_{av}$. The output signal $R_o$ for the multiplexer 264 is the average magnitude of autocorrelation signal $R_{av}$ when the signal $R(1,1)$, that is output from the delay device 262 and is a magnitude indicator value, is less than the magnitude threshold signal $R_{th}$. Conversely, the output $R_o$ from the multiplexer 264 is the signal $R(1,1)$ when the magnitude signal $R(1,1)$ is greater than or equal to the magnitude threshold signal $R_{th}$. Similarly, the output $P_o$ from the power-smoothing circuit 182 is the average power signal $P_{av}$ when the power signal $P(1,1)$, that is output from the delay device 276 and is a power indicator value, is less than the power threshold signal $P_{th}$, and the signal $P_o$ is the signal $P(1,1)$ when the power signal $P(1,1)$ is greater than or equal to the power threshold signal $P_{th}$.

The present invention is a method and system for selectively smoothing color flow images in a color flow ultrasound system. The present invention takes flow conditions into consideration, such that smoothing is performed only when desired. Therefore, the present invention is able to minimize smearing caused by conventional smoothing that averages color flow signals when smoothing is not desired.

We claim:

1. A method for selectively smoothing color flow images in a ultrasound system, the method comprising:

receiving a set of original digitized ultrasound signals, the set of original digitized ultrasound signals being formed into adjacent beamlines, each beamline including a plurality of samples, each original digitized ultrasound signal including a velocity signal, a magnitude of autocorrelation signal, and a power signal;

selecting a velocity signal, a magnitude of autocorrelation signal, and a power signal of a selected sample along a selected beamline;

computing a set of smoothed digitized ultrasound signals by averaging the velocity signals, the magnitude of autocorrelation signals, and the power signals of the set of original digitized ultrasound signals;

comparing the selected velocity signal, the selected magnitude of autocorrelation signal, and the selected power signal to a first velocity threshold, a first magnitude threshold, and a first power threshold, respectively;

computing color flow information from the smoothed digitized ultrasound signals when each of the selected velocity signal and the selected magnitude of autocorrelation signal and the selected power signal is less than the first velocity threshold, the first magnitude threshold, and the first power threshold, respectively;

computing the color flow information from the set of original digitized ultrasound signals when any one of the selected velocity signal, the selected magnitude of autocorrelation signal, or the selected power signal is greater than or equal to the first velocity threshold, the first magnitude threshold, or the first power threshold, respectively; and overlaying the color flow information onto an ultrasound image.

2. The method of claim 1, wherein the set of original digitized ultrasound signals includes the velocity signals, the magnitude of autocorrelation signals, and the power signals of the selected sample along the selected beamline, samples along the selected beamline that are adjacent the selected sample, and samples along adjacent beamlines that are adjacent the samples along the selected beamline.

3. The method of claim 2, wherein eight samples are averaged.

4. The method of claim 3, wherein the eight samples include:

a first sample that is the selected sample along the selected beamline;

second and third samples along the selected beamline that are adjacent the first sample along the selected beamline;

fourth, fifth, and sixth samples along a first adjacent beamline that is adjacent the selected beamline, the fourth, fifth, and sixth samples being adjacent the first, second, and third samples; and seventh and eighth samples along a second adjacent beamline that is adjacent the selected beamline, the seventh and eighth samples being adjacent the first and second samples.

5. The method of claim 1, wherein the velocity threshold, the magnitude threshold, and the power threshold are adjustable.

6. The method of claim 1 further comprising:

comparing the selected velocity signal, the selected magnitude of autocorrelation signal, and the selected power signal to a second velocity threshold, a second magnitude threshold, and a second power threshold, respectively;

computing a set of transitional ultrasound signals by computing a weighted average of the selected velocity signal and the averaged velocity signal, the selected magnitude of autocorrelation signal and the averaged magnitude of autocorrelation signal, and the selected power signal and the averaged power signal; and computing the color flow information from the set of transitional ultrasound signals when each of the selected velocity signal and the selected magnitude of autocorrelation signal and the selected power signal is less than the first velocity threshold, the first magnitude threshold, and the first power threshold, respectively, and when any one of the selected velocity signal, the selected magnitude of the autocorrelation signal, and the selected power signal is greater than or equal to the second velocity threshold, the second magnitude threshold, or the second power threshold, respectively.

7. The method of claim 6, wherein weighting factors for computing weighted averages include:

a difference between the selected velocity signal and the second threshold;

a difference between the selected magnitude of autocorrelation signal and the first magnitude threshold;

a difference between the selected magnitude a autocorrelation signal and the second magnitude threshold;

a difference between the selected power signal and the first power threshold; and a difference between the selected power signal and the second power threshold.

8. The method of claim 6, wherein the second velocity threshold, the second magnitude threshold, and the second power threshold are less than the first velocity threshold, the first magnitude threshold, and the first power threshold, respectively.

9. An ultrasound system comprising:

an ultrasound probe that directs a set of ultrasonic signals into a patients body and receives an original set of returned echo signals from the patient's body, the set of ultrasonic signals being formed into adjacent beamlines, each beamline including a plurality of samples, each returned echo signal having component signals including a velocity signal, a magnitude of autocorrelation signal, and a power signal;

a processor that receives and analyzes the set of returned echo signals to compute a Doppler shift of the returned echo signals, the processor including:

means for selecting a velocity signal, a magnitude of autocorrelation signal, and a power signal of a selected sample along a selected beamline;

a digital filter that smoothes the returned echo signals by averaging the velocity signals, the magnitude of autocorrelation signals, and the power signals;

a first comparator that compares the selected velocity signal with a first velocity threshold signal;

a second comparator that compares the selected magnitude of autocorrelation signal with a first magnitude threshold; and a third comparator that compares the selected power signal with a first power threshold signal; and a display device that displays an image of the Doppler shift of the smoothed echo signals when each of the selected velocity signal, the selected magnitude of autocorrelation signal, and the selected power signal is less than the first velocity threshold, the first magnitude threshold, and the first power threshold, respectively, the display device displaying an image of the Doppler shift of the original set of returned echo signals when any one of the selected velocity signal, the selected magnitude of autocorrelation signal, and the selected power signal is greater than or equal to the first velocity threshold, the magnitude threshold, and the first power threshold, respectively.

10. The ultrasound system of claim 9, wherein the digital filter averages the velocity signals, the magnitude of autocorrelation signals, and the power signals of the selected sample along the selected beamline, samples along the selected beamline that are adjacent the selected sample, and samples along adjacent beamlines that are adjacent the samples along the selected beamline.

11. The ultrasound system of claim 10, wherein the digital filter averages eight samples.

12. The ultrasound system of claim 9, wherein the digital filter applies a set of coefficients to the returned echo signals.

13. The ultrasound system of claim 12, wherein the set of coefficients that are selected from a group consisting of rectangular coefficients, Gaussian coefficients, and triangular coefficients.

14. The ultrasound system of claim 9, for the comprising:

a fourth comparator that compares the selected velocity signal with a second velocity threshold signal;

a fifth comparator that compares the selected magnitude of autocorrelation signal with a second magnitude threshold;

a sixth comparator that compares the selected power signal with a second power threshold signal;

means for computing a set of transitional echo signals by computing a weighted average of the selected velocity signal and the averaged velocity signal, the selected magnitude of autocorrelation signal and the averaged magnitude of autocorrelation signal, and the selected power signal and the averaged power signal; and wherein the display device displays an image of the Doppler shift of the transitional echo signals when each of the selected velocity signal and the selected magnitude of autocorrelation signal and the selected power signal is less than the first velocity threshold, the first magnitude threshold, and the first power threshold, respectively, and when any one of the selected velocity signal, the selected magnitude of autocorrelation signal, and the selected power signal is greater than or equal to the second velocity threshold, the second magnitude threshold, or the second power threshold, respectively.

15. The ultrasound system of claim 14, when weighting factors for computing weighted averages include:

a difference between the selected velocity signal and the second threshold;

a difference between the selected magnitude of autocorrelation signal and the first magnitude method;

a difference between the selected magnitude a autocorrelation signal and the second magnitude threshold;

a difference between the selected power signal and the first power threshold; and a difference between the selected power signal and the second power threshold.

16. The ultrasound system of claim 14, when the second velocity threshold, the second magnitude threshold, and the second power threshold are less than the first magnitude threshold, and the first power threshold, respectively.

* * * * *